Figure 1:
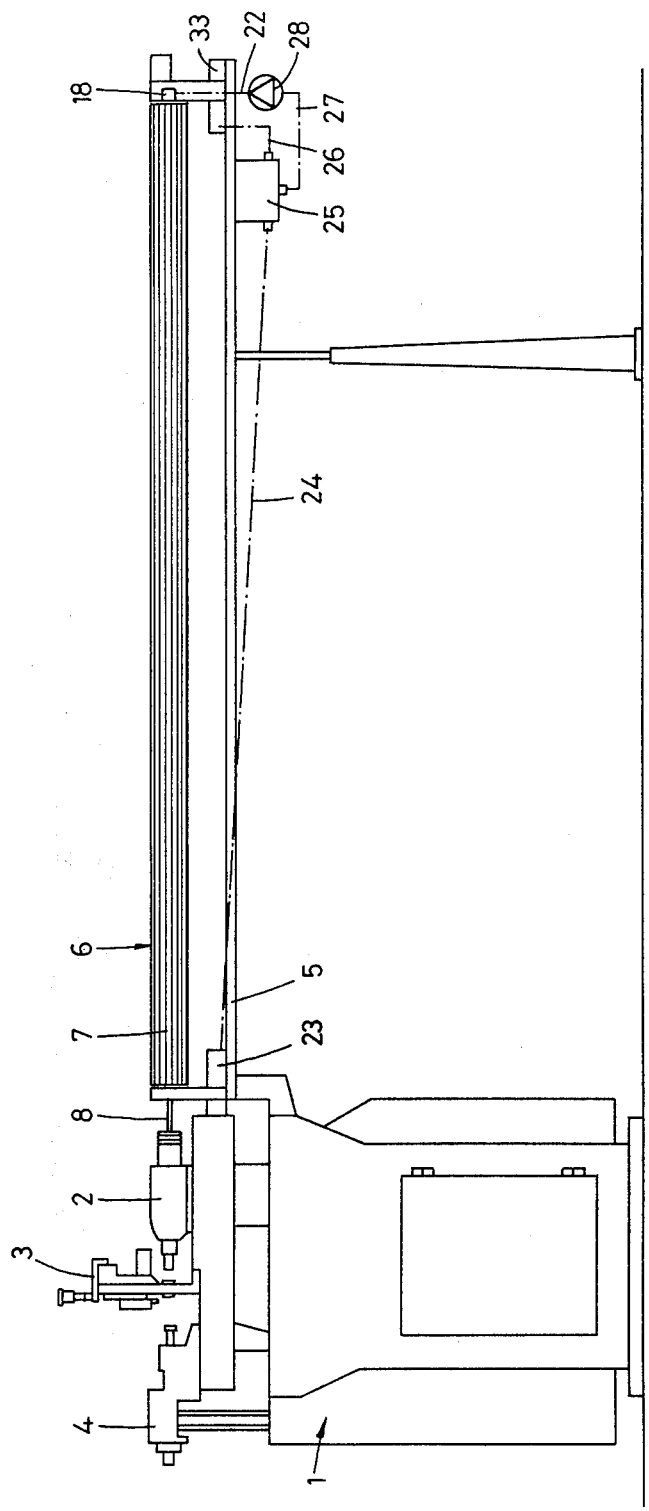

United States Patent [19]

Scheurer

[11] 3,945,506

[45] Mar. 23, 1976

[54] FEED APPARATUS FOR AUTOMATIC LATHE

[76] Inventor: Philippe Scheurer, Bas-Du-Village, 2802 Develier, Bern, Switzerland

[22] Filed: Oct. 15, 1974

[21] Appl. No.: 514,785

[30] Foreign Application Priority Data

Oct. 16, 1973 Switzerland.................... 14638/73

[52] U.S. Cl. ..................... 214/1.2; 82/2.7; 214/1.4
[51] Int. Cl.² ............................................ B65H 5/16
[58] Field of Search .......... 214/1.4, 1.2, 1.5; 82/2.5, 82/2.7

[56] References Cited
UNITED STATES PATENTS 3,823,628  7/1974  Fortune ........................ 214/1.4 X

FOREIGN PATENTS OR APPLICATIONS 1,201,904  8/1970  United Kingdom................ 214/1.4

Primary Examiner—Albert J. Makay
Assistant Examiner—George F. Abraham
Attorney, Agent, or Firm—Stevens, Davis, Miller & Mosher

[57] ABSTRACT

A bar stock feeding apparatus for an automatic lathe, comprising a tube for guiding the bar stock. A piston is situated in the tube behind the bar stock for pushing it towards the headstock of the lathe, the piston itself being urged towards the headstock by means of oil pressure while part of the oil overtakes the piston by flowing through a clearance left between the piston and the inner wall of the tube and through an inner channel through the piston having an adjustable cross-section. Regulating means and non-return valve means are provided in the inner channel for rendering the piston retractable responsive to oil underpressure applied instead of the oil pressure.

11 Claims, 5 Drawing Figures

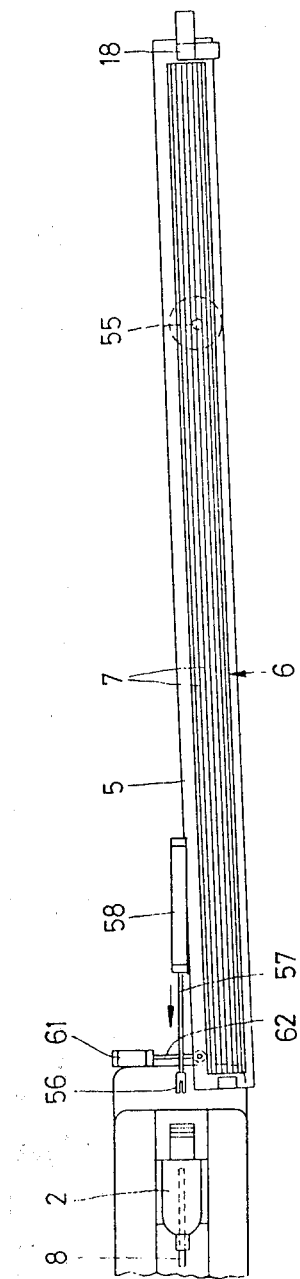
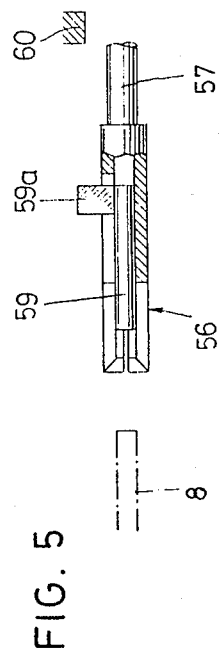
FIG. 4
FIG. 5

FEED APPARATUS FOR AUTOMATIC LATHE

This invention relates to a feed apparatus for an automatic lathe having a headstock spindle equipped with a collet opening at the end of each cycle, comprising at least one tube intended to guide a piece of bar stock engaged in the headstock spindle, and means for exerting pressure upon the bar stock in order to prevent it from remaining axially integral with the collet when the collet opens at the end of each cycle.

Feed apparatus of this kind are already commonly known in which the pressure means are purely mechanical and comprise, for example, a stock pusher disposed within the tube and provided with a lateral lug which projects from the tube through a slot and is driven along the tube by a linear driving mechanism outside the tube. These completely mechanical feed arrangements are complicated, and besides having a tendency to break down easily, they are noisy to operate, above all when the bar to be machined is rotated at high speed by the headstock. Moreover, the friction between the bar and the end of the stock pusher produces scraps which tend to clog up the tube rapidly. On the other hand, these completely mechanical arrangements make it possible to retract the stock pusher without too much difficulty, particularly to withdraw it when it has penetrated relatively far forward into the headstock in order to push the bar stock back behind the collet so as to use up the bar to the maximum. Such retraction is then necessary to enable a lateral displacement of the tube, which must either be supplied with a new piece of bar stock and then realigned with the headstock, or else make way for a new tube already supplied with a bar. An extractor will meanwhile have temporarily taken the place of tube in alignment with the headstock in order to withdraw the scrap end of the bar which cannot be machined any further.

Offsetting the advantage of comparatively easy retraction of the stock pusher in such apparatus, however, are the disadvantages represented by the complicated arrangement of such a mechanism and the other drawbacks already mentioned above.

Also known is a feed apparatus comprising hydraulically operated pressure means. In one embodiment of such an apparatus, (disclosed in Swiss Pat. No. 514,381) oil is purposely allowed to leak into the tube and serves both as a hydraulic pressure agent and as a lubricating and flushing agent. This arrangement makes the apparatus less noisy to operate and avoids clogging of the tube by machining scraps. This advantage is not present in another hydraulic construction (U.S. Pat. No. 3,464,203) where the pressure oil is retained by fluid-tight seals instead of being allowed to leak out. On the other hand, this fluid-tight piston arrangement makes it possible to control the retraction of the stock pusher hydraulically. Such retraction is difficult and delicate to accomplish with the first-mentioned hydraulic arrangement, where the oil may leak into the tube, for in the form in which it has been proposed, it can be easily used in but one direction, viz., to advance the bar towards the headstock, owing to the necessarily limited amount of suction head (not supported by any pressure in excess of atmospheric pressure in the other direction) and to the irregular and indeterminate effect of the "leakage" passages provided for the oil but, if all the oil is exhausted, also admitting air. Thus mechanical auxiliary means are virtually required for retracting the stock pusher, at least when the apparatus assumes any but the smallest dimensions. These auxiliary means may consist, for example, of two nylon pulleys mounted against each side of the stock pusher and driven in rotation at the proper time and in the proper direction in order to retract the stock pusher. These complications represent a significant drawback of the hydraulic arrangement of the "oil leakage" type, even though it does have the abovementioned notable advantages of low noise and no wear or clogging, plus simplicity of design as far as the purely hydraulic portion is concerned, i.e., not counting the auxiliary mechanical retraction means.

It is the object of this invention to provide a feed apparatus which is simple in its construction, quiet in its operation and free of any tendency to clog the tube, and which, in addition, enables the pusher element to be retracted simply and reliably, under favorable conditions, without any outside auxiliary mechanism, and whatever may be its size.

To this end, in the feed apparatus according to the present invention, the means for exerting pressure comprise a piston engaged with clearance in the tube and a hydraulic device adapted to supply oil under pressure to the rear of the tube, the oil overtaking the piston with loss of pressure and simultaneously pushing the piston forwards, and the piston in turn pushing the bar stock towards the headstock, the piston comprising an inner channel for the passage of oil disposed parallel to a channel formed by the clearance of the piston in the tube, the inner channel being sealable and adjustable with the aid of regulating means.

In a preferred embodiment, the regulating means comprise a needle-valve arrangement adapted to close or to open, to a greater or lesser extent, a passage formed by the inner channel through the piston.

Also, in a preferred embodiment, the pressure means are so disposed that when the bar has reached the end of its use, it may be pushed, with the aid of an extension-piece adapted to penetrate into the headstock spindle, until its rearward end is situated just behind the collet of the headstock. For this purpose the aforementioned extension-piece consists of a part forming a continuation of the piston towards the front, being axially connected to it in both directions, and being of such dimensions that it is able to penetrate into the headstock spindle up to the collet, the hydraulic device being so arranged as to be likewise capable of drawing the oil out of the tube by means of underpressure, thereby causing the piston and the part forming a continuation thereof to retract sufficiently to disengage this part completely from the headstock.

Preferably, the feed apparatus comprises a plurality of tubes disposed in the form of a drum, and the pressure means comprise one piston in each tube and one hydraulic device which is common to all tubes and is provided with means for connecting a reversible-action oil-pump to whichever of the tubes is brought into alignment with the headstock spindle.

In order to prevent the exhaustion of the oil from causing too great a quantity of oil to return through the inner channel, especially when this channel is completely opened, the regulating means may also be provided with non-return valve means disposed on the inner channel in order to allow the oil to flow from behind the piston to in front of it to the full extent determined by the regulating means, and to prevent or at least impede the return of the oil from in front of the piston to behind it through the inner channel. Preferably, these valve means are ball-valve means.

Figure 2:
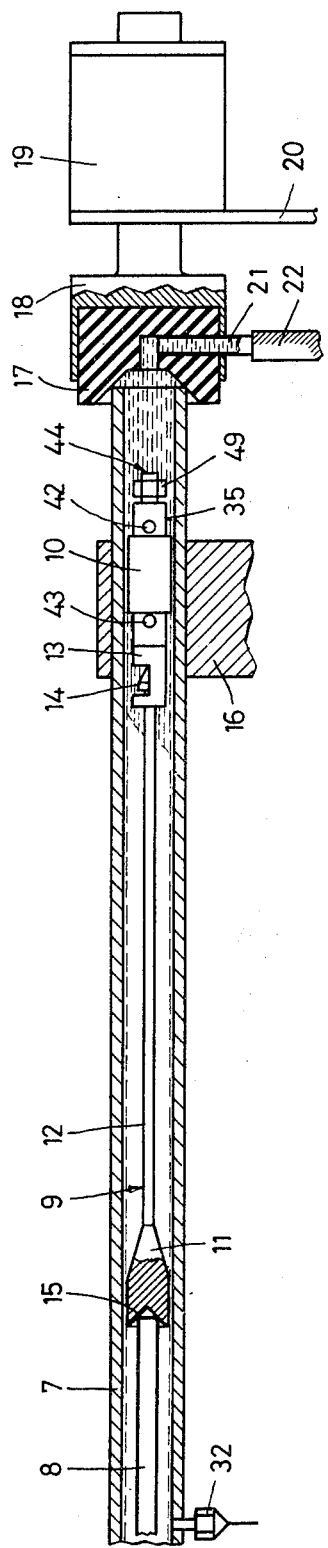
Figure 3:
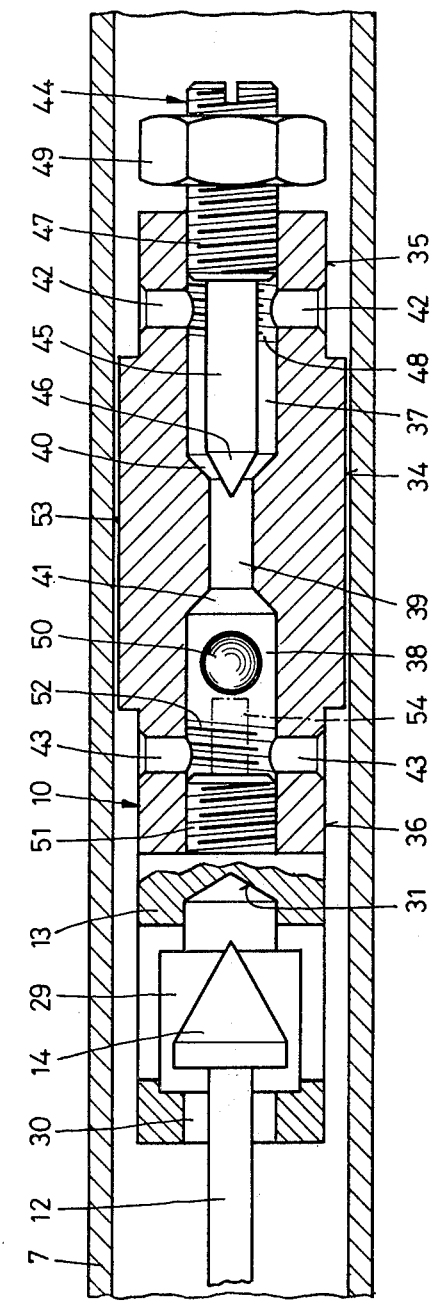

Other objects and advantages of the invention will become apparent from the following detailed description of a preferred embodiment thereof, taken in conjunction with the accompanying drawings, in which:

FIG. 1 is an elevation of a movable-headstock lathe equipped with a feed apparatus of the type in question, FIG. 2 is a partial axial section, on a larger scale than FIG. 1, of the feed apparatus illustrated in FIG. 1, FIG. 3 is a horizontal section of a piston comprised in the feed apparatus according to FIGS. 1 and 2, FIG. 4 is a plan view corresponding to FIG. 1 and further showing an extractor, and FIG. 5 is a longitudinal section of a part of the extractor shown in FIG. 4.

The drawing shows a movable-headstock automatic lathe 1, the essential elements of which are a headstock 2, a frame 3 for the radial tool-holders, and a toolholder frame 4 disposed frontally facing the headstock 2. The means for driving the headstock and the various tools, which are controlled in a conventional manner from a cam shaft, are not shown. Disposed behind the lathe 1 on a support 5 is a drum 6 composed of a number of bar-guiding tubes 7 integral with one another and disposed equidistantly parallel to an axis of rotation parallel to that of the headstock 2. The drum 6 is adapted to rotate about its axis so as to bring each of the tubes 7 (FIG. 2) which compose it into a position coaxial with the headstock 2. The tube 7 which is aligned with the axis of the headstock 2 is the one situated halfway up the drum (or capstan) 6 on the side of it facing away from the viewer of FIG. 1, i.e., at the location which would correspond to "three o'clock" if the drum 6 were viewed from the right-hand end with respect to FIG. 1. Each tube 7 of the drum 6 contains a bar 8 to be machined, the front end of which engages in the headstock 2 when the respective tube 7 is in working position. The free space between the front end of the drum 6 and the rearward end of the headstock 2, on the order of 15-20 cm., is crossed freely by the bar 8.

The bar 8 engaged in the headstock 2 is pushed from right to left, as viewed in FIGS. 1 and 2, by pressure means comprising a stock pusher 9 and a piston 10 disposed one behind the other. The stock pusher 9 comprises a rod 12 provided at its front end with a pushing head 11 machined with a conical recess 15. The bar 8 may be inserted in the tube 7 with its rearward end rough as it comes from the works. It is in contact with the stock pusher 9 via the conical face of the recess 15. The conicity of the latter is sufficient to establish proper centering of the bar 8 without there ever being any risk of the bar 8 becoming jammed in the recess 15. Hence if the stock pusher 9 is withdrawn towards the rear (right-hand side of FIG. 2), it will never be held back by the bar 8, which is itself clamped in the collet of the headstock 2. The rearward end of the connecting rod 12 of the stock pusher 9 is provided with an "arrowhead" 14 which cooperates with a coupler 13 integral with the piston 10, this coupler 13 comprising (FIG. 3) a cavity 29 which receives the "arrowhead" 14, and the front wall of which has a notch 30 admitting the rod 12, so as to establish in a known manner a bidirectional axial kinematic connection between the coupler 13 of the piston 10 and the arrowhead 14 of the stock pusher 9.

The rearward end of the tube 7 is normally open. It projects towards the rear away from a brace 16 which forms part of the frame of the drum 6. However, the rearward end of the tube 7 which is in working position is connected to an oil supply circuit via a coupling member 17 made of rubber or of a plastic material having the elasticity of rubber, and forming a suction-cup. The oil supply circuit is, as will be explained further on, capable of supplying oil at either overpressure or underpressure by means of a reversible-action pump 28 (FIG. 1). The couplingmember 17 is borne by a support 18 which can be actuated by a pneumatic cylinder 19 mounted on a support 20. The control means for the cylinder 19 are not shown. The coupling member 17 has a passage 21 connecting with a pipe 22, which is in turn connected to the pump 28. The oil supply circuit may also comprise an oildischarge container as well as multichannel gates and the check-valves necessary to enable the apparatus to operate properly.

The operation of the apparatus is as follows: when the drum 6 shifts to bring a new tube 7 opposite the headstock 2, this tube 7 is provided with a bar 8, and both the stock pusher 9 and the piston 10 are situated at its rearward end. The cylinder 19 moves the support 18 of the coupling member 17 so as to cause the latter to engage on the rearward end of the tube 7, as shown in FIG. 2. The supply pump 28, shut off during the shifting operation, is then started up so as to provide oil under pressure, and the oil fills the rearward end of the tube 7 so that pressure is exerted upon the piston 10. However, there is enough clearance between the cylindrical surface of the piston 10 and the tube 7 to allow the oil to flow between the piston and the tube. It therefore flows on around the connecting rod 12 of the stock pusher 9 and around the bar 8, after having undergone a drop in pressure around the piston 10. The clearance between the pushing head 11 and the tube 7 is appreciably greater than that between the piston 10 and the tube 7, especially taking into consideration the presence of a second passage for the oil through the piston 10, which will be described below. Thus the oil flows freely at reduced pressure up to the front end of the tube 7, where it is collected in a container 23 before being returned through a pipeline 24 to a main reservoir 25 of the oil supply circuit. If necessary, deflectors may be provided to keep the oil from coming into contact with the other tubes 7 of the drum 6. Thus the pressure of the oil exerts an axial thrust upon the bar 8 via the piston 10 and the stock pusher 9. When the bar 8 has been gripped by the collet of the headstock 2, it is driven rotatingly. Generally, it will cause the stock pusher 9 to rotate as well inasmuch as the friction between the point of the "arrowhead" 14 of the stock pusher 9 and the bottom of an inner conical depression 31 at the rear of the cavity 29 will be less than the friction between the rearward end of the bar 8 and the conical recess 15 of the pushing head 11. In certain cases, however, it is possible that instead of the stock pusher 9 being rotated, the bar 8 will rotate with friction in the conical recess 15. Particles may be detached from the bar 8 by this friction, and, they are carried away by the oil, as is the contaminating waste matter from the surface of the bar 8 which is liable to rub off on the inner wall of the tube 7 when the bar 8 comes in contact with it. Thus the tube 7 is kept clean. Moreover, it has been found that the noise is considerably lessened when the bar 8 rotates in an oil bath.

As may be seen in FIG. 2, a sensor 32, which may be a sensor of the type which operates electromagnetically or some other type and which is sensitive to the pressure prevailing within the tube 7, is disposed in the vicinity of the front end of the tube 7. As the bar 8 is used up, the stock pusher 9 and the piston 10 approach the headstock 2 until finally the pushing head 11 of the stock pusher 9 leaves the tube 7 at the front, enters the headstock 2, and arrives just behind the collet gripping the bar 8 in front of the headstock 2. The sensor 32 is so positioned along the tube 7 that the piston 10 passes the sensor 32 at the moment when the pushing head 11 reaches the point just behind the collet, allowing for a certain safety margin. The sensor 32 is adjusted to respond, not to the reduced pressure prevailing in front of the piston 10, but to the higher pressure prevailing behind the piston 10. Hence the sensor 32 is actuated at the moment when the bar 8 has advanced far enough for the piston 10 to be completely past the sensor 32. A signal transmitted by the sensor 32 at that moment causes a triggering action, the result of which is that at the end of the machining cycle then in progress, the lathe comes to a complete stop, the collet being opened. At that moment, i.e., at the end of the cycle during which the sensor 32 has provided the aforementioned triggering action, electric means act upon the pump 28 so as to reverse its direction of operation, and this has the rapid effect of producing an underpressure of oil behind the piston 10 instead of an overpressure. The piston 10 therefore begins to retract, pulling along the stock pusher 9, the pushing head 11 of which withdraws from the headstock 2 again and —preferably but not necessarily— re-enters the tube 7. The period of time during which the operation of the pump 28 is reversed in order to apply the underpressure behind the piston 10 is governed by a timer adjusted so that the piston 10 and the stock pusher 9 retract for a suitable distance. It should be noted that the oil pressure applied to cause the piston 10 to advance is on the order of 1–3 atm gauge pressure, i.e., 1–3 kg/sq.cm., and might be even higher, if necessary. On the other hand, the underpressure used to cause the piston 10 and the stock pusher 9 to retract can naturally not reach −1 atm gauge pressure (absolute pressure = 0), and it is within the range of from 0.6 to 0.8 atm gauge pressure, i.e., 0.6 to 0.8 kg/sq.cm., preferably 0.75 kg/sq.cm., which means that the absolute pressure of the oil is then approximately one-quarter of an atmosphere.

Once the stock pusher 9, including its pushing head 11, has retracted far enough, the drum 6 may move sideways towards the "operator" side of the lathe, i.e., towards the eye of a person viewing FIG. 1, and while the drum 6 rotates by one step to prepare for the placement of a new tube 7 provided with a new piece of bar stock to be machined, an extractor 56–59 mounted on the frame of the drum 6 comes into alignment with the headstock 2, enters into it, grasps the scrap end of the used bar, and pulls it backwards out of the headstock. The specific structure of this extractor will be explained further in relation to FIGS. 4 and 5. The drum 6 then moves back into place to align the new tube with the headstock, and the extractor moves laterally towards the back of FIG. 1 to discharge the scrap end. These movements are favored by a positioning of the drum 6 which necessitates only a minimal lateral displacement. This positioning is such that during normal operation of the lathe, the particular tube of the drum which is aligned with the headstock is the one halfway up the drum on the "hidden" side in FIG. 1, i.e., in the three o'clock position if the drum is viewed from the right-hand side of FIG. 1 (the rear of the drum). This arrangement of the drum likewise facilitates re-loading of the emptied tubes by the operator.

It will be understood that the apparatus in question is just as suitable for a fully-automatic installation, where all the movements of the drum are controlled automatically, as for a semi-automatic installation, where the machine is stopped when a bar is used up and the operations to be carried out at that time are performed manually. It should also be noted that when the pump 28 supplies an underpressure, the oil exhausted from the tube through the pipe 22 is returned by the pump 28 to the main reservoir 25 via the pipe-line 27 connecting the pump to that reservoir. Upon changing tubes, when the resilient coupling member 17 is retracted by the action of the cylinder 19, a certain amount of oil runs out at the back of the tube. Provision has therefore been made at the back of the frame of the drum 6 for a collector pan 33 which catches this oil and returns it to the main reservoir 25 via a pipe-line 26.

It may happen that bars 8 of different diameters may have to be loaded in any tube 7, according to the parts to be machined on the lathe 1, and there may even be bar stock which is not round but angular in section, e.g., square or hexagonal. It has been found that in order to have the quietest possible operation and the best possible conditions for flushing waste matter out of the tube, the amount of oil passing in front of the piston to flow around the stock pusher and the bar should differ according to the diameter and the profile of the bar. It is important to be able to use the same piston 10 for the same tube diameter. Therefore, if the only provision for allowing the oil to flow from behind the piston to in front of it were the clearance between the piston and the tube, the pressure of the pump would have to be considerably increased if the oil flow were to be increased, e.g., for certain types of profiled bars. Besides requiring a pump capable of supplying a higher pressure, such an increase in pressure increases the force of the pressure to an extent which may no longer be acceptable. In other circumstances, it may be desired to increase the advancing pressure without increasing the amount of oil flowing from the back to the front of the piston. To remedy these drawbacks, an adjustable inner channel is provided for the passage of oil through the piston, as shown in FIG. 3. By decreasing the clearance between the outer wall of the piston and the inner wall of the tube, with respect to what it would be in the absence of this inner channel, the result obtained is that the adjustment of the passage through this channel provides a choice between a greater or lesser flow of oil, with the same pump pressure, than there would be in the absence of the inner channel.

Moreover, when this inner channel is fully open, the flow of oil is relatively great; and when underpressure is applied to cause the piston and the stock pusher to retract, it might happen that the entire rather small quantity of oil still in front of the piston at that moment is pumped out, so that the underpressure of the pump begins to exhaust air rather than oil. If that were to happen, the retraction of the piston and the stock pusher might be seriously prejudiced. Hence valve-forming means are provided inside the piston which allow oil to pass through the inner channel of the piston in only one direction, viz., from back to front, and which block the passage of the oil in the opposite direction when underpressure is applied to retract the piston.

The sectional view shown in FIG. 3 illustrates in detail the particular arrangement of the piston which enables the aforementioned result to be obtained. It will be seen that the piston 10, leaving aside the coupler 13 intended to connect it to the stock pusher 9, is formed of a cylindrical piece, the middle portion of which has an outer cylindrical surface 34 of a diameter very close to the inside diameter of the tube 7, so that there is relatively little clearance (app. one-tenth of a millimeter) between the piston and the tube at this location. The piece comprises two cylindrical end portions, one on each side of the middle portion having outer surfaces designated as 35 for the rearward end portion and 36 for the front end portion. The outer surfaces 35 and 36 are appreciably smaller in diameter than the inside of the tube 7, so that the oil may pass without loss of pressure between the inside wall of the tube 7 and the outer surfaces 35 and 36. The piece also comprises an axial bore 37, 38, 39 which, although the ends of it are stopped as will be seen further on, passes completely through the piece prior to assembly. This axial bore comprises a rear portion 37 and a front portion 38, both of relatively large diameter, and between them, a narrowed portion 39 situated within the middle portion of the piece. There is a frustoconical transition passage 40 between the portions 39 and 37, and a similar frustoconical transition passage 41 between the portions 39 and 38. Moreover, two or more radial bores 42 extend from the surface 35 of the rearward end portion to the wide portion 37 of the axial bore; in like manner, two or more radial bores 43 connect the outer surface 36 of the front end portion and the wide front portion 38 of the axial bore. The rearward end of the axial bore comprises an internal thread 48 into which is screwed the threaded head 47 of a valve needle 44 which projects a cylindrical stem 45 axially towards the forward end of the portion 37 of the axial bore and ends in a point 46 which is adapted to cooperate with the frustoconical inner surface 40 to regulate the cross-section of the passage between the portion 37 and the portion 39 of the axial bore. The fact that the head 47 of the needle 44 stops the rearward end of the axial bore does not at all interfere with the communication between the portion 37 of the bore and the space behind the piston 10 in the tube 7, owing to the presence of the radial bores 42 which open out on the surface 35 relatively distant from the inner surface of the tube 7. Thus by screwing the needle 44 in or out to a greater or lesser extent when the piston 10 is out of the tube 7 or is all the way at the back of it, it is possible to adjust the cross-section of the inner channel through the piston 10. A check nut 49 is screwed onto the threaded head 47 of the needle 44, and when tightened, it eliminates the risk of the needle 44 becoming maladjusted as a result of vibration.

Towards the front of the piston 10, a ball 50 is inserted in the wide front portion 38 of the axial bore. The ball 50 is larger in diameter than the narrowed portion 39 and the radial bores 43 but appreciably smaller in diameter than the wide portion 38. Once the ball 50 has been inserted in the portion 38, a threaded projection 51 integral with the coupler 13 is screwed into an internal thread 52 at the forward end of the portion 38 of the axial bore, and the threaded projection 51 imprisons the ball 50 within the portion 38.

Owing to the presence of the radial bores 43, free communication is at all times ensured between the space in front of the piston 10 and the inner space 38 where the ball 50 is situated, even though the front end of the axial bore is stopped by the threaded projection 51 of the coupler 13. It will be noted that the outside diameter of the coupler 13 is the same as that of the end portions 35 and 36 of the piece forming the body of the piston 10, so that the oil has no trouble flowing from the mouths of the bores 43 to the space in front of the coupler 13 integral with the piston 10. It will also be noted that the piece provided with the aforementioned bores and forming the body of the piston 10 is, as a component part, completely symmetrical, thus facilitating assembly of the fully-equipped piston; the threads 38 and 52 are identical, the spaces 37 and 38 are identical, the inner frustoconical surfaces 40 and 41 are identical, and the outer surfaces 35 and 36 are likewise identical.

It will be easily understood that when the oil seeks to pass from back to front (from right to left as viewed in FIG. 3), the oil which is allowed to pass by the point 46 of the needle 44 pushes the ball 50 away from the frustoconical passage 41, so that nothing but the point 46 forms an obstacle to the passage of the oil through the channel 42, 37, 39, 38, 43. When underpressure is applied at the rear of the tube 7, on the other hand, the oil seeking to pass from front to back through the channel 43, 38, 39, 37, 42 pushes the ball 50 against frustoconical surface 41, so that the passage is substantially closed off. Obviously, the intention is not to prevent all passage of the oil in this way since a certain amount of oil passes outside the surface 34 into the clearance 53 in any case. The function of the ball 50 is rather very greatly to reduce the possible flow from front to back in the inner channel. Moreover, in order that the oil may carry the ball 50 along easily, this ball is made of a light material, e.g., of an oil-resistant plastic material having a specific gravity close to that of the oil, or of aluminum.

Furthermore, it is possible to dispose in the face of the threaded part 51 of the coupler 13 a projection 54 appreciably smaller in diameter than the portion 38; as shown by the dot-dash line in FIG. 3, this projection 54 prevents the ball 50 from rolling forward until it is in line with the radial bores 43 if it is feared that the ball 50, coming to rest near a radial bore 43 would no longer be displaced by the oil circulating back and entering by the other bore or bores 43. With the projection 54, the ball 50 is forced to remain in the oil current and cannot help but be pressed against the frustoconical surface 41 if that current flows from front to back.

It should be noted that the piece forming the piston 10 is preferably made of the usual bar-lathe steel (cemented iron), although other metals may likewise be used, and even certain plastic materials might be suitable in certains cases.

Finally, it is pointed out that according to the adjustment effected by means of the needle 44, the pump 28 must supply a greater or lesser flow at a given uniform pressure. Depending upon the type of pump used, it will be necessary or unnecessary to change the adjustment of the pump when the adjustment of the needle 44 is changed; if it is a pump with a very flat characteristic, i.e., one with only a slight variation in pressure even for a great variation in flow, it will not be necessary to change the adjustment of this pump, whereas if the pump has a falling characteristic, a widening of the channel through the piston will require that the pressure/flow characteristic of the pump be raised.

When passing alongside the pushing head 11 of the stock pusher 9, the oil should not undergo a loss of pressure less than the loss of pressure it undergoes when passing around and through the piston. Therefore, the cross-section of the oil passage around the pushing head 11 should be as great as the maximum passage cross-section left through the needle-valve. If this condition is met, the adjustment of the pressure sensor 32 may remain the same whatever the adjustment of the needle 44 may be; if, on the contrary, there were too great a drop in pressure alongside the pushing head 11, an increase in the oil flow would mean—despite the fact that this flow results from a wider passage cross-section in the piston 10—an increase in the pressure to be supplied by the pump, i.e., an increase upstream from the pushing head 11. The pressure which would exist alongside the sensor 32 at the moment when the pushing head 11 passes by it, but before the piston 10 has passed by it, in the case of a large passage cross-section through the piston, might be as great as, or even greater than, the pressure prevailing behind the piston with a low flow of oil. Hence the sensor 32 would be liable to operate prematurely when the pushing head 11 passes by instead of only when the piston 10 has passed by. In order to avoid this, it is naturally possible to reduce the diameter of the pushing head 11; if it is desired not to leave too much play for it in the tube 7, so that it will not vibrate there, provision may be made along the peripheral surface of the pushing head 11 for large longitudinal grooves which will give the pushing head 11 a cross-section taking the form of a star or of a triangle. It would naturally also be possible to provide that a change in the adjustment of the needle 44, which does not take place very often, be associated with a change in the adjustment of the pressure sensor 32.

FIG. 4 shows how an extractor comprising a cylinder 58, a rod 57, and an extractor-gripper 56 is mounted on the side of the frame 5 of the drum 6. A cylinder 61 having a rod 62 connected to the frame 5, moves the latter sideways and brings the extractor system 56, 57, 58 into alignment with the headstock, the rod 57 being retracted in the piston 58. The pressure is applied to the piston 58 and the rod 57 with the extractor gripper 56 is moved forwards, the gripper 56 being so pushed into the headstock.

As shown in FIG. 5 the extractor-gripper 56 is hollow with its front part radially sliced, so that it can grip the scrap end with a sufficient force due to its resiliency. An ejector 59 having a lateral lug 59a fixed thereto, is lodged in the hollow of the extractor-gripper. This ejector 59 has the same diameter as the scrap end to be removed by the extractor. With the ejector 59 being near the front end of the gripper 56, the chuck formed by the sliced front part is slightly open and the scrap end enters the gripper without difficulty since the latter is pushed forwards. Then the scrap end abuts the ejector 59, which slides toward the rear end of the hollow within the extractor gripper 56. Resiliency of the front part of the gripper 56 causes it to grip the scrap end with force.

Pressure is then given in the other direction into cylinder 58 and the gripper 56 returns backwards, taking with it the scrap end. When the scrap end is entirely retracted from the headstock, the lug 59a abuts a stop 60 during its movement backwards caused by the cylinder 58; the ejector 59 then stops its movement while the gripper 56 further moves backwards. The ejector 59 thus slides again towards the front end of the gripper 56, in the internal hollow thereof. This relative movement pushes the scrap end which is ejected from the gripper and falls into a convenient receptacle. At this moment the cylinder 61 moves again the drum 6 into a working condition and a new tube is placed in alignment with the headstock.

It will be understood that the concept of the apparatus described above might be applied in numerous other embodiments; for example, the pressure means, the oil-channel regulating means, and the oil-return blocking means might very well also be utilized in a feed apparatus comprising a single tube which is reloaded and replaced each time the bar it contains is used up. By the same token, the means for adjusting the inner channel for the oil might be different from the needle-valve means described, and the valve-forming means might very well be of some other type than the ball-type.

Moreover, it will be clear that the term "reversible-action pump" is understood to mean not only a pump such as a geared pump or an axial-propellor pump, where the direction of flow depends upon the direction of rotation, but also a pump such as a centrifugal pump, where the internal flow is always in the same direction, but which is equipped with channel-switching gates to reverse the direction of flow relative to the pipe-lines outside the pump.

Finally, the feed apparatus might very well also be used for a machine-tool other than a movable-headstock automatic lathe.

What is claimed is:

1. A feed apparatus for an automatic lathe having a headstock equipped with a collet opening at the end of each working cycle of said lathe, comprising:
    at least one tube arranged for being disposed in alignment with said headstock for guiding a piece of bar stock engaged in said headstock, the front end of said tube being near said headstock and the rear end of said tube being remote from said headstock,
    means for exerting pressure upon said bar stock for preventing it from remaining axially integral with said collet when said collet opens,
    wherein said means for exerting pressure comprise: a piston engaged with clearance in said tube, said clearance forming a passage bypassing said piston,
    means provided on said piston for pushing said bar stock towards said headstock responsive to a movement of said piston towards said headstock, and
    a hydraulic arrangement adapted for supplying oil under pressure at said rear end of said tube and thereby urging said piston with said bar stock towards said headstock, said piston including:
    an inner channel having an adjustable cross-section and being operatively parallel to said passage formed by said clearance, and
    regulating means in said inner channel for adjusting said cross-section of said inner channel, wherein said oil supplied under pressure by said hydraulic arrangement passes by said piston with loss of pressure through said passage and through said inner channel in an amount determined by said regulating means.

2. A feed apparatus in accordance with claim 1, wherein said regulating means comprise a needle-valve arrangement adapted to close and open said inner channel to a greater or lesser extent.

3. A feed apparatus in accordance with claim 1, wherein said means provided on said piston for pushing said bar stock comprise an extension piece forming a continuation of said piston towards said front end of said tube and being axially connected to said piston in both directions, said extension piece having a sufficiently small diameter to penetrate into said headstock almost up to said collet, thereby allowing said bar stock, when reaching the end of its use, to be pushed until its rearward end is situated just behind said collet, and wherein said hydraulic arrangement is further adapted to draw said oil out of said tube by means of underpressure, whereby said piston and said extension piece are sufficiently retracted to disengage said extension piece completely from said headstock.

4. A feed apparatus in accordance with claim 3, wherein said piston further comprises non-return valve means disposed in said inner channel for allowing said oil to flow from behind said piston to in front of it to the full extent determined by said regulating means and for at least substantially preventing a return of said oil from in front of said piston to behind it through said inner channel.

5. A feed apparatus in accordance with claim 4, wherein said non-return valve means are ball-valve means.

6. A feed apparatus in accordance with claim 3, wherein there is a plurality of tubes disposed in the form of a drum, each tube being adapted to come in turn into alignment with the axis of said headstock, and wherein said means for exerting pressure comprise one piston in each tube and one said hydraulic arrangement common to all tubes provided with means for connecting a reversible-action oil-pump to whichever of said tubes is brought into alignment with said headstock, said plurality of tubes disposed in a drum form being further provided with an extractor and arranged to enable said extractor, each time another tube has to replace a preceding tube in alignment with the axis of said headstock, to enter said headstock for withdrawing therefrom the scrap end of a used bar stock.

7. A feed apparatus in accordance with claim 3, wherein said extension piece includes a stock pusher comprising a rod, the rearward end of which is axially attached to said piston, and a pushing head integral with said rod at the front end thereof.

8. A feed apparatus in accordance with claim 7, wherein said pushing head is designed to leave between it and said tube an oil passage having a cross-section at least equal to the greatest bypassing cross-section around and through said piston.

9. A feed apparatus in accordance with claim 8, wherein sensor means are disposed in the vicinity of said front end of said tube at a predetermined distance therefrom for detecting the arrival of said piston in an advanced position corresponding to the farthest permissible advance position of said pushing head into said headstock, said sensor means being responsive to oil pressure in said tube with such an adjustment that said sensor means are actuated by the operative oil pressure existing behind said piston but not actuated by the reduced pressure existing in front of said piston.

10. A feed apparatus in accordance with claim 3, wherein a single reversible-action oil-pump is provided for supplying said oil pressure and said oil underpressure, said oil pressure being approximately 1–3 kg/sq.cm. above atmospheric pressure and said underpressure being approximately 0.6–0.8 kg/sq.cm. below atmospheric pressure.

11. A feed apparatus in accordance with claim 4, wherein said piston comprises:
a body of generally cylindrical form and comprising symmetrically a middle part adapted to be guided in said tube with said clearance, and two end parts of equal diameter, said diameter being less than that of said middle part,
an axial bore passing through said body and having a throttling over a length axially corresponding to said middle part, and two non-throttled portions over the lengths axially corresponding to said end parts, tapered transition portions being disposed at both ends of said length presenting a throttling for rejoining said non-throttled portions,
radial bores constituting at both end parts at least one flowpath between the peripheral surface of said end part and the corresponding non-throttled portion of said axial bore, a needle screwed from the rearward end into the rear non-throttled portion of said axial bore for providing said regulating means in cooperation with one of said tapered transition portions,
a ball with a diameter larger than that of said radial bores, disposed in the front non-throttled portion of said axial bore for providing said non-return valve means in cooperation with the other of said tapered transition portions, and
a coupler adapted to axially secure said extension piece to said piston and screwed from in front into said front non-throttled portion of said axial bore for providing a stop closing off said front non-throttled portion and preventing said ball from escaping therefrom.

* * * * *